(12) United States Patent
Moerbe

(10) Patent No.: US 11,335,196 B2
(45) Date of Patent: May 17, 2022

(54) METHOD FOR DATA CLASSIFICATION AND DATA TRANSMISSION IN VEHICLES

(71) Applicant: Robert Bosch GmbH, Stuttgart (DE)

(72) Inventor: Matthias Moerbe, Ilsfeld-Helfenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/271,576

(22) PCT Filed: Oct. 10, 2019

(86) PCT No.: PCT/EP2019/077451
§ 371 (c)(1),
(2) Date: Feb. 25, 2021

(87) PCT Pub. No.: WO2020/104099
PCT Pub. Date: May 28, 2020

(65) Prior Publication Data
US 2021/0350701 A1 Nov. 11, 2021

(30) Foreign Application Priority Data
Nov. 22, 2018 (DE) .......................... 102018219998.1

(51) Int. Cl.
*G08G 1/0967* (2006.01)
*G06F 3/14* (2006.01)
*B60K 35/00* (2006.01)
*B62J 50/22* (2020.01)

(52) U.S. Cl.
CPC ....... *G08G 1/096791* (2013.01); *B60K 35/00* (2013.01); *B62J 50/22* (2020.02); *G06F 3/14* (2013.01); *B60K 2370/152* (2019.05)

(58) Field of Classification Search
CPC combination set(s) only.
See application file for complete search history.

(56) References Cited

U.S. PATENT DOCUMENTS

| 7,613,564 B2 * | 11/2009 | Vorona ................. G08G 1/0104 |
| | | 340/995.12 |
| 8,897,806 B2 | 11/2014 | Wakikawa et al. |
| 10,042,364 B1 * | 8/2018 | Hayward ............... G08G 1/093 |
| 10,297,092 B2 * | 5/2019 | Schaffer ............... G07C 5/0816 |
| | (Continued) | |

FOREIGN PATENT DOCUMENTS

| AU | 2017100444 A4 * | 5/2017 | ............. G06Q 40/08 |
| DE | 102008042539 A1 | 4/2010 | |
| | (Continued) | | |

OTHER PUBLICATIONS

International Search Report for PCT/EP2019/077451, dated Jan. 20, 2020.

*Primary Examiner* — Chico A Foxx
(74) *Attorney, Agent, or Firm* — Norton Rose Fulbright US LLP; Gerard Messina

(57) ABSTRACT

In a method for data classification and data transmission in vehicles, event data which characterize an event that occurs in a first vehicle are stored in a data packet. Event data of the data packet are transmitted from the first to a second vehicle and displayed there if at least a portion of the event data and/or driving-specific data from the first vehicle corresponds to a driving or event category that is determined in the second vehicle.

14 Claims, 1 Drawing Sheet

(56) References Cited

U.S. PATENT DOCUMENTS

| | | | | |
|---|---|---|---|---|
| 10,334,199 | B2* | 6/2019 | Teixeira | H04W 4/21 |
| 10,417,714 | B1* | 9/2019 | Christensen | G07C 5/008 |
| 10,431,089 | B1* | 10/2019 | Nguyen | B60Q 9/00 |
| 10,453,342 | B2* | 10/2019 | Biehle | G08G 1/096791 |
| 10,522,038 | B2* | 12/2019 | Bielby | G08G 1/0116 |
| 11,024,165 | B2* | 6/2021 | Julian | G07C 5/0866 |
| 11,048,832 | B2* | 6/2021 | Alvarez | G06F 30/20 |
| 11,061,408 | B1* | 7/2021 | Hayward | B60W 50/14 |
| 2014/0336914 | A1* | 11/2014 | Vorona | G08G 1/096791 |
| | | | | 701/119 |
| 2017/0305434 | A1* | 10/2017 | Ratnasingam | G05D 1/0088 |
| 2018/0053420 | A1* | 2/2018 | Reckziegel | G08G 1/163 |

FOREIGN PATENT DOCUMENTS

| | | | | |
|---|---|---|---|---|
| DE | 102012014457 A1 | | 1/2014 | |
| DE | 102014216796 A1 | | 2/2015 | |
| DE | 102014114825 A1 | | 4/2015 | |
| DE | 102019209268 A1 | * | 12/2020 | B60W 50/0097 |
| DE | 102019134833 A1 | * | 6/2021 | G08G 1/096716 |
| EP | 3037314 A1 | * | 6/2016 | B60W 50/082 |
| WO | 2015074798 A1 | | 5/2015 | |

\* cited by examiner

METHOD FOR DATA CLASSIFICATION AND DATA TRANSMISSION IN VEHICLES

FIELD

The present invention relates to a method for data classification and data transmission in vehicles. In addition, the present invention relates to a data classification and data transmission system in vehicles.

BACKGROUND INFORMATION

PCT Application No. WO 2015/074798 A1 describes a method for evaluating the behavior of the driver in a vehicle. In the method, sensor data are ascertained via a sensor system in the vehicle and the driver behavior is evaluated on the basis of the sensor data. Different behavior categories are distinguished, and sensor data including a probability value are assigned to each behavior category. A behavior category is detected as accurate if the allocated probability exceeds the threshold value.

Also in the related art is the transmission of sensor information from a first vehicle to a second vehicle in order to possibly activate safety functions in the second vehicle or in order to output warning signals. For example, vehicles driving behind are thereby able to be warned of a possible obstacle that is situated on the road.

SUMMARY

The use of the method according to an example embodiment of the present invention makes it possible to classify data and to transmit the data between vehicles, in particular between road-bound vehicles. In the process, physical event data which characterize an event that occurs in a first vehicle or in the vehicle environment are stored in a data packet in the first vehicle. Under certain circumstances, this data packet is able to be transmitted from the first vehicle to a second vehicle and made available to the second vehicle, for instance in order to inform or warn the second vehicle or the driver in the second vehicle about environment conditions of the first vehicle. However, in order to avoid an information overload of the driver in the second vehicle as a result of a large data volume, information filtering is carried out in which the data packet with the physical event data is transmitted from the first to the second vehicle and displayed there only if certain preconditions are met. These preconditions are satisfied if at least a portion of the event data and/or driving-specific data from the first vehicle corresponds to a driving or event category that is determined in the second vehicle.

This approach has the advantage that it can be specified in the second vehicle whether and which information is going to be displayed in the second vehicle. Effective filtering of the information is realized in this way and it can be ensured that the driver will not be overloaded by a large data volume or his attention be reduced as a result.

During the data filtering, data packets are transmitted from the first to the second vehicle and displayed only if certain data from the first vehicle correspond to a driver or event category that is determined in the second vehicle. The driver or an automated system in the second vehicle specifies a driving or event category to which at least a portion of the data from the first vehicle must be allocated in order for event data of the data packet to be displayed in the second vehicle.

The driving or event category may include objective or subjective criteria. For example, it is possible to specify person-specific data in the second vehicle for the driving or event category, for instance with regard to a dynamic, an average or a cautious driver type. For instance, a dynamic driver type will safely control the vehicle even at higher speeds because his or her experience so that the filtering makes it possible to display only the particular data that are also of relevance to a dynamic driver. For example, these are potholes in which relatively high vertical accelerations occur when driven over. It is possible to specify higher vertical acceleration limit values for dynamic types of drivers than for average or cautious driver types, which means that only corresponding event data of the data packet will then also be displayed in the second vehicle. Conversely, the limit value for the vertical accelerations will be lower if an average or a cautious driver type is involved.

The comparison of the data from the first vehicle to the driving or event category of the second vehicle is carried out on the basis of the physical event data and/or the driving-specific data of the first vehicle. The physical event data in the first vehicle are obtained from sensor information supplied by a sensor system in the first vehicle. These are state variables at the position level, the speed level and/or the acceleration level for translatory and/or rotatory variables. In addition, forces and moments in the vehicle are considered. Finally, other physical variables such as temperature data in the vehicle or a vehicle power unit are also able to be taken into account.

In addition, event data that characterize the vehicle environment are considered such as the ambient temperature, detected obstacles on the road, potholes or similar things. Such event data are able to be stored in the data packet individually or in any combination.

On the one hand, the driving-specific data pertains to driver-related data, for instance a certain driver type, as described above. On the other hand, vehicle-specific data are considered as well, in particular with regard to the vehicle type such as a motorcycle, a passenger car or a truck.

On the side of the second vehicle, a driving or event category that forms the basis of the comparison with the event data and/or the driving-specific data of the first vehicle is specified. The driving category, for example, involves a certain driver type and/or vehicle-specific information, in particular the vehicle type such as a motorcycle, a passenger car, or a truck.

One or more different categories may be taken into account in the filtering. For example, it is useful in all cases to consider the vehicle type so that only data packets of first vehicles whose type is identical to the vehicle type of the second vehicle are displayed. Furthermore, additional filtering operations are able to be carried out, for instance as described above in connection with the driver type. In addition or as an alternative, it is also possible to carry out event-related filtering, for example to specify as a filter criterion in the second vehicle a certain acceleration limit value, e.g., for the vertical acceleration, so that only packets are transmitted from the first vehicle if the vertical accelerations exceed the predefined limit value.

According to one advantageous embodiment of the present invention, the driving-specific data are additionally stored in the data packet in the first vehicle and possibly displayed in the second vehicle. This makes it possible also to display in the second vehicle the driving-specific data of the first vehicle in addition to the physical event data.

All of the usual display possibilities are available for the display of the data in the second vehicle, in particular in an optical, acoustic and/or haptic manner.

The driving or event category in the second vehicle is either specified by the driver or is automatically determined in the second vehicle. In the case of a manual specification by the driver, the driver, for example, is able to set his or her own driver type (dynamic, average, cautious) and thereby specify a corresponding filter function for the information to be displayed in the vehicle. As an alternative, the driver in the second vehicle is able to manually specify as a filter criterion some other variable such as a state variable limit value, e.g., a certain acceleration limit value.

In the automatic ascertaining of the driving or event category, a corresponding filter criterion is automatically determined in the second vehicle from event data obtained from sensors and/or from driving-specific data. For instance, it is possible to determine the type of driver who is currently in the vehicle with the aid of data from the sensor system installed in the vehicle such as longitudinal and transverse acceleration values.

According to a further advantageous embodiment of the present invention, the driving-specific data involves information that has a causal relationship with the physical event data such as state variables caused by the driver as a reaction to the physical event data. For instance, if the first vehicle drives over a pothole while cornering and if the vehicle is a motorcycle, then the driver is able to adapt his speed and his angled position in response to the pothole. These are driving-specific data as a reaction, which thus have a causal relationship with driving over the pothole. The physical event data in connection with the pothole, on the other hand, are defined by the vertical acceleration and the position of the pothole. Both the physical event data and the driving-specific data that have a causal relationship with the physical event data may be part of the data packet and be displayed in the second vehicle, as the case may be.

According to one further advantageous embodiment of the present invention, the data packet with the physical event data and also possibly the driving-specific data is always transmitted from the first to the second vehicle but will be displayed in the second vehicle only if the filter criterion has been satisfied. As an alternative, it is also possible to transmit the filter criterion from the second to the first vehicle and to check in the first vehicle whether the filter criterion has been satisfied. The data transmission of the data packet from the first to the second vehicle and the display in the second vehicle will take place only if this criterion is met.

According to a further advantageous embodiment of the present invention, the selection of the data from the data packet that is displayed depends on the driving category or the event category. This ensures that only data that are relevant to the driver will be displayed. For example, a dynamic motorcycle rider will be interested in other data than a cautious motorcycle rider. The data selection is configured via the driving and event category.

In an advantageous manner, the data in the data packet are standardized. The position of the event data and the driving-specific data is specified within the data packet. This ensures that the transmitted data are able to be correctly interpreted and displayed in the receiving vehicle.

It may be useful to transfer all available data recorded in the first vehicle to the second vehicle in the data packet and to select the data to be displayed only in the second vehicle based on the driving and/or event category. In an alternative embodiment of the present invention, it is also possible to transfer only the particular data from the first to the second vehicle that are also meant to be displayed.

A further aspect of the present invention relates to a data classification and data transmission system in vehicles for carrying out the afore-described method. In accordance with an example embodiment of the present invention, the system includes at least two vehicles, which are equipped with a control unit in each case, and a data classification is carried out in the control unit of the first vehicle to the effect that event data in the first vehicle and possibly driving-specific data are stored in a data packet. The system also includes a data transmission device for transmitting data packets from the first to the second vehicle. An evaluation of the transmitted data packet is carried out in the control unit in the first or the second vehicle. In addition, the second vehicle is equipped with a display unit for the display of event data and possibly driving-specific data from the data packet. However, the display is undertaken only if at least a portion of the event data and/or the driving-specific data of the first vehicle corresponds to a driving or an event category in the second vehicle. This criterion is able to be checked either in the control unit of the first vehicle or in the control unit of the second vehicle.

Additional advantages and useful embodiments are able to be gathered from the description herein and the figures.

DETAILED DESCRIPTION OF EXAMPLE EMBODIMENTS

Figure 1:
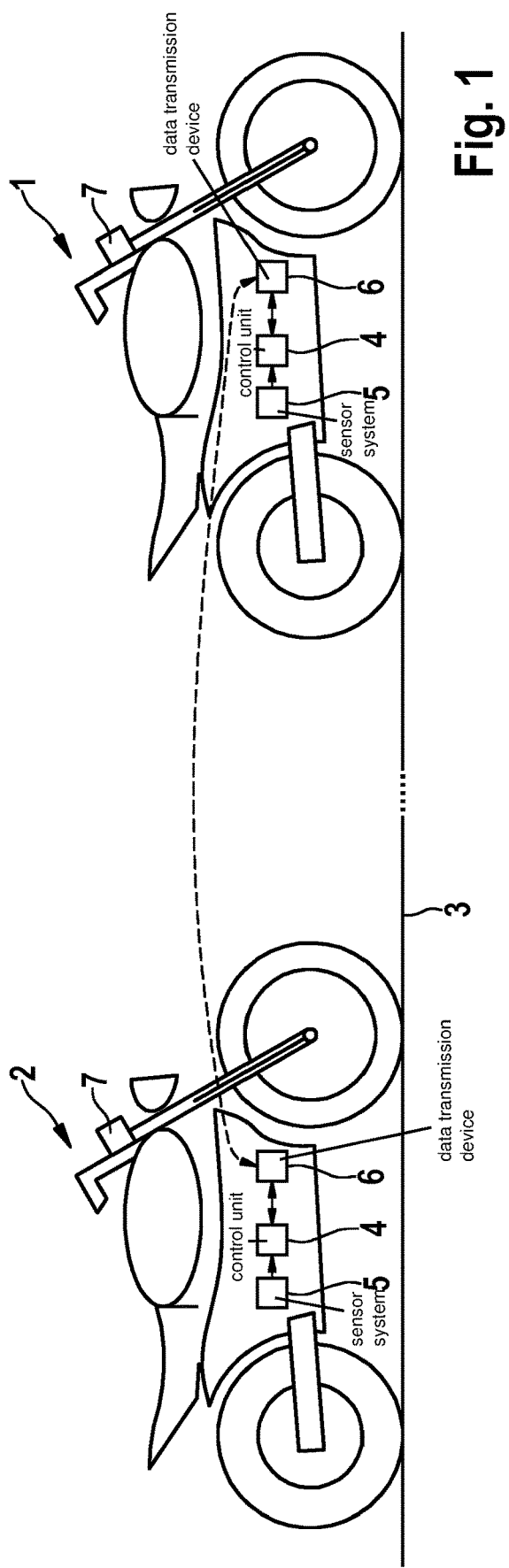
FIG. 1 shows two motorcycles driving behind one another between which data packets are exchanged, in accordance with an example embodiment of the present invention.

FIG. 1 shows two motorcycles 1, 2, which are traveling on the same road 3 at a distance from each other. Both motorcycles 1, 2 are equipped with a control unit 4, a sensor system 5, a data transmission device 6, and a display unit 7 by which a variety of data is able to be displayed. Sensor system 5 records physical event data, which are state variables in the motorcycle such as the driving speed and different accelerations in the longitudinal, transversal and vertical directions, and possibly also rotation variables such as the yaw rate. In addition, sensor system 5 is able to record physical variables of the vehicle environment, in particular the ambient temperature. It may also be possible to acquire further environment variables via sensor system 5, for instance obstacles located on the road, with the aid of radar. The data acquired via sensor system 5 are transmitted to control unit 4 in motorcycle 1, 2.

The driver on second, trailing motorcycle 2 is able to specify a driving or an event category for the display of certain data on his display unit 7 that are recorded in first motorcycle 1 via sensor system 5. Based on the driving or event category, the selection of the data to be displayed is made. For example, if the driver of second motorcycle 2 is a dynamic motorcycle rider, then only a certain data category that differs from the data category of a cautious motorcyclist will be of interest to him. For instance, only vertical accelerations that lie above a certain limit value that is higher than the corresponding limit value for a cautious motorcyclist are of interest to a dynamic rider. The driving or event category is therefore specified by the information 'dynamic' and 'motorcycle' in this exemplary embodiment.

Both a specification of the driving or event category by the driver and an automatic specification of the driving or event category as well as mixed forms are possible. For example, it is possible that that the information that a motorcycle is involved is automatically included in the determination of the driving or event category, whereas the information that the motorcycle rider involves a dynamic rider, an average rider or a cautious rider is specified by the motorcycle rider. The information that a motorcycle is involved is able to be fixedly stored.

In one alternative embodiment of the present invention, the driving or event category may also be set in a completely automatic manner. The information of the driver type is able to be determined from driving state variables which are acquired via sensor system 5 in the first motorcycle. To this end, the recorded state variables such as the vehicle speed and a variety of acceleration and deceleration values are evaluated and the driver type is specified based on these values.

The driving and event category in second motorcycle 2 is transmitted either via data transmission device 6 to first motorcycle 1, a data packet with event data or possibly also additional driving-specific data being requested in control unit 4 situated there, which is then transmitted via data transmission device 6 from first motorcycle 1 to second motorcycle 2 where it is displayed on its display unit 7.

In an alternative embodiment of the present invention, it is also possible to transmit a data packet from first motorcycle 1 to second motorcycle 2 in all instances, and to then make a decision in second motorcycle 2 as to whether as well as which data from the data packet are going to be displayed in display unit 7 of second motorcycle 2 based on the driving and event category.

Figure 2:
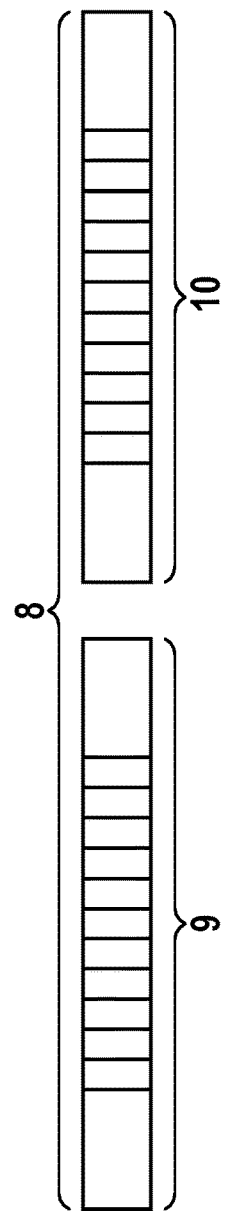
FIG. 2 shows, in a symbolic representation, the structure of a data packet that is exchanged between the motorcycles, in accordance with an example embodiment of the present invention.

FIG. 2 shows a data packet 8, which is made up of event data 9 and driving-specific data 10. Event data 9 involve physical data, in particular state variables, which are acquired with the aid of the vehicle's own sensor system. The event data, for example, are driving state variables recorded by sensors such as speed variables and various acceleration values as well as rotatory variables such as the yaw rate.

Driving-specific data 10, for one, involve objective variables such as the type of vehicle, e.g., a motorcycle or a passenger vehicle, as well as subjective variables relating to the driver type, e.g., a dynamic driver, an average driver, or a cautious driver. In addition, it is possible to allocate to the driving-specific data also physical state variables that characterize the driver type, in particular state variables caused by the driver as a reaction to physical event data. For example, if driving over a pothole is present as a physical event, which is accompanied by corresponding high vertical accelerations that are stored as physical event data 9, the particular state variables related to an evasive maneuver of the driver are able to be stored under driving-specific data 10 such as the steering angle characteristic or an angled position of the motorcycle.

In any event, event data 9 and driving-specific data 10 are standardized insofar as the position of a specific data type is specified within each partial packet 9, 10. This ensures that the transmitted data are able to be correctly interpreted and displayed in the receiving vehicle.

What is claimed is:

1. A method for data classification and data transmission in vehicles, the method comprising the following steps:

storing in a data packet (a) physical event data which characterize an event that occurs in a first vehicle or in a vehicle environment of the first vehicle and (b) driver classification data which categorize a driver proficiency of a driver of the first vehicle determined from sensor data of the first vehicle;

transmitting the data packet from the first vehicle to a second vehicle;

determining whether to display a representation of the event data of the data packet based on the driver classification data of the data packet and based on a categorization of a driver proficiency of a driver of the second vehicle; and responsive to the determination being to display the representation, displaying the representation of the event data of the data packet.

2. The method as recited in claim 1, wherein the categorization of the driver proficiency of the driver of the second vehicle is specified by the driver of the second vehicle.

3. The method as recited in claim 1, wherein the categorization of the driver proficiency of the driver of the second vehicle is automatically ascertained from event data and/or from driving-specific data in the second vehicle.

4. The method as recited in claim 1, wherein driver action that caused physical event data is included in the data packet.

5. The method as recited in claim 4, wherein driver action performed by a driver of the first vehicle as a reaction to the physical event data is included in the data packet.

6. The method as recited in claim 1, wherein a limit value for a physical state variable is specified in the second vehicle, the displaying of the representation of the event data of the data packet being performed only when a corresponding physical state variable of the first vehicle exceeds the limit value.

7. The method as recited in claim 1, wherein the data packet with the physical event data is always transmitted from the first to the second vehicle, but the displaying of the representation of the event data of the data packet is performed in the second vehicle only when a predefined condition with respect to the driver classification data of the data packet and the categorization of the driver proficiency of the driver of the second vehicle is satisfied.

8. The method as recited in claim 1, wherein the data packet with the physical event data is transmitted from the first vehicle to the second vehicle only when a predefined condition with respect to the driver classification data and the categorization of the driver proficiency of the driver of the second vehicle is satisfied.

9. The method as recited in claim 1, further comprising storing in the data packet vehicle classification data which classifies a type of the first vehicle, wherein the determining of whether to display the representation is further based on the vehicle classification data and based on a classification of a type of the second vehicle.

10. The method as recited in claim 9, wherein the determining of whether to display the representation is based on a comparison of the type of the first vehicle indicated by the vehicle classification data and the type of the second vehicle.

11. The method as recited in claim 1, wherein the determining of whether to display the representation is based on a comparison of the driver proficiency of the driver of the first vehicle indicated in the data packet and the driver proficiency of the driver of the second vehicle.

12. The method as recited in claim 1, wherein the driver proficiency of the driver of the second vehicle is manually entered.

13. A data classification and data transmission system in vehicles, the system comprising:
- a control unit in a first vehicle configured to:
  - generate (a) driver classification data which categorize a proficiency of a driver of the first vehicle based on sensor data of the first vehicle and (b) physical event data which characterize an event that occurs in the first vehicle or in a vehicle environment;
  - store the driver classification data and the physical event data in a data packet;
- a data transmission device configured to transmit the data packet from the first vehicle to a second vehicle;
- a control unit in the second vehicle; and
- a display unit in the second vehicle;
- wherein the control unit in the second vehicle is configured to:
  - determine whether to display a representation of the event data of the data packet based on the driver classification data of the data packet and based on a categorization of a driver proficiency of a driver of the second vehicle; and
  - responsive to the determination being to display the representation, display the representation of the event data of the data packet in the display unit.

14. A method comprising:
- receiving, by a second vehicle from a first vehicle, a data packet that includes (a) physical event data which characterize an event that occurs in the first vehicle or in a vehicle environment of the first vehicle and (b) driver classification data which categorize a driver proficiency of a driver of the first vehicle determined from sensor data of the first vehicle;
- determining, by the second vehicle, whether to display a representation of the event data of the data packet based on the driver classification data of the data packet and based on a categorization of a driver proficiency of a driver of the second vehicle; and
- responsive to the determination being to display the representation, displaying the representation of the event data of the data packet on a display device of the second vehicle.

* * * * *